United States Patent Office 2,865,917
Patented Dec. 23, 1958

2,865,917
MEROCYANINE DYES

Douglas James Fry, Bernard Alan Lea, and John David Kendall, Ilford, England, assignors to Ilford Limited, Ilford, England, a British company No Drawing. Application August 5, 1957
Serial No. 676,383

Claims priority, application Great Britain August 17, 1956

6 Claims. (Cl. 260—240.4)

This invention relates to merocyanine dyes, their production and use.

According to the present invention there are provided merocyanine dyes of the general formula:

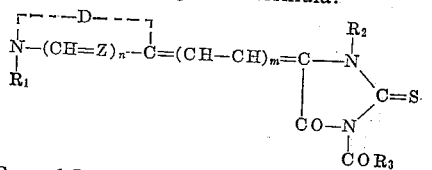

where $R_1$ and $R_2$ are the same or different alkyl, aralkyl or aryl groups, $R_3$ is an alkyl, aryl, aralkyl or alkoxy group, Z is a nitrogen atom or a =CH— group, $n$ is nought or one, $m$ is nought, 1, 2 or 3 and D is the residue of a five-membered or six-membered heterocyclic nitrogen nucleus.

Where in the foregoing formula alkyl groups are referred to these are preferably lower alkyl groups, i. e. containing up to 4 carbon atoms, especially methyl or ethyl groups, but they may be higher alkyl groups. Where aryl groups are referred to these may be wholly hydrocarbon, e. g. phenyl or naphthyl, or may contain substituents, e. g. halogen, alkyl or alkoxy substituents. Where aralkyl groups are referred to these may be benzyl or naphthyl methyl. Where alkoxy groups are referred to these are preferably lower alkoxy groups, e. g. methoxy or ethoxy.

Thus the values of the various symbols may be stated as follows: $R_1$ and $R_2$ are each selected from the class consisting of lower alkyl groups, benzyl, naphthyl methyl, phenyl, naphthyl halophenyl, alkylphenyl and alkoxyphenyl groups, $R_3$ is selected from the foregoing class and lower alkoxy groups, Z is selected from the class consisting of the —N= radicle and the —CH= radicle, $n$ is selected from nought and 1, $m$ is selected from nought, 1, 2 and 3, and D is a residue selected from the class consisting of five-membered and six-membered heterocyclic nitrogen nuclei.

D may be the residue of any five-membered or six-membered heterocyclic ring system including thiazoles, oxazoles, selenazoles and their polycyclic homologues such as those of the benzene or naphthalene series; pyridine and its polycyclic homologues, such as quinoline and α- and β-naphthoquinolines; indolenines; diazines such as pyrimidines and quinazolines. The polycyclic compounds of these series may be substituted in the carbocyclic rings with one or more groups such as alkyl, aryl, alkoxy and methylene dioxy groups, or by halogen atoms.

According to a further feature of the invention the aforesaid merocyanine dyes are prepared by condensing a compound of the formula:

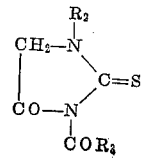

with a compound of the formula:

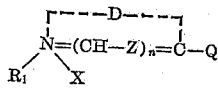

where Q is a thioether (—SR), thioether-alkenyl (—(CH=CH)$_m$SR) or acetanilidovinyl grouping, R being an alkyl or aralykyl group, X being an acid radicle and the other symbols having the meanings assigned to them above.

Q is thus a grouping selected from the class consisting of alkyl thioether, aralkyl thioether, alkyl thioether alkenyl, aralkyl thioether alkenyl and acetanilidovinyl.

The reaction is preferably effected in the presence of a basic condensing agent, e. g. pyridine or triethylamine.

The compound of Formula III may conveniently be formed in situ by methods known per se from the literature.

The merocyanine dyes are valuable optical sensitisers for silver halide photographic emulsions, and the invention includes such emulsions (and photographic elements containing the same) which contain such dyes in sensitising amount.

The following examples will serve to illustrate the invention. The intermediate 3-benzoyl-1-phenyl-2-thiohydantoin may be made by the method disclosed in J. Chem. Soc., 1956, page 188. The intermediate 3-benzoyl-1-methyl-2-thiohydantoin, M. Pt. 134–136° C., may be made by heating together on a waterbath for 1 hour equimolecular amounts of benzoyl isothiocyanate and sarcosine, mixing in a little ethanol and filtering off the crystalline product.

EXAMPLE 1

*3-benzoyl-1-phenyl-2-thio-5 [(3-methyl-2:3-dihydro-2-benzthiazolylidene)ethylidene]thiohydrantoin*

2-methylbenzthiazole (1.5 gm.) and methyl p-toluene sulphonate (1.9 gm.) were mixed and heated on a water bath until a solid quaternary salt was formed. After washing the solid with dry ether, acetic anhydride (5 ml.) and diphenyl formamidine (2.1 gm.) were added and the mixture heated under reflux for 15 minutes. After cooling, dry ether was added to precipitate a gum. After stirring with further portions of dry ether, 3-benzoyl-1-phenyl-2-thiohydantoin (2.0 gm.), ethanol (20 ml.) and triethylamine (1.4 ml.) were added and the mixture heated under reflux for 15 minutes. The product separated on cooling in ice and after filtering off was washed with water and then ethanol. The crude dye was crystallised from ethanol and recrystallised from a mixture of chloroform and ethanol. The dark green crystals had M. P. 248–250° C. When incorporated in a silver iodobromide emulsion the sensitivity was extended to 6200 A., whilst in a silver chlorobromide the sensitivity extended to 6450 A. with a maximum at 5900 A.

EXAMPLE 2

*3-benzoyl-1-phenyl-2-thio-5[(3-ethyl-2:3-dihydro-2-benzthiazolylidene)ethylidene]thiohydantoin*

The compound was prepared as Example 1 except that 2-methyl benzthiazole ethiodide (2.0 gm.) was used in place of 2-methyl benzthiazole metho p-toluene sulphonate.

The crude dye (1.46 gm., M. Pt. 247–250° C.) was crystallised from a mixture of ethanol (100 mls.) and chloroform (30 ml.) and obtained as purple needles (0.8 gm.) with M. Pt. 259–261° C. When incorporated in a silver iodobromide emulsion the sensitivity was extended to 6450 A. with a maximum at 6200 A., whilst in a silver chlorobromide the sensitivity extended to 6400 A. with a maximum at 5900 A.

EXAMPLE 3

3-benzoyl-1-phenyl-2-thio-5[(3-methyl-2:3-dihydro-2-benzoxazolylidene)ethylidene]thiohydantoin

The compound was prepared as in Example 1, but starting with 2-methylbenzoxazole metho p-toluene sulphonate (3.2 gm.). The crude dye (2.7 gm., M. Pt. 231–232° C.) crystallised from 1200 mls. of ethanol as purple red crystals (1.3 gm.) with M. Pt. 270–273° C. When incorporated in a silver iodobromide emulsion the sensitivity was extended to show a maximum at 5750 A., whilst in a silver chlorobromide the sensitivity extended to 5650 A. with a maximum at 5450 A.

EXAMPLE 4

3-benzoyl-1-phenyl-2-thio-5-[(3-ethyl-2:3-dihydro-2-benzoxazolylidene)ethylidene]thiohydantoin

The compound was prepared as in Example 1, but starting with 2-methyl benzoxazole etho-p-toluene sulphonate (3.3 gm.). The crude dye (1.9 gm.) crystallised from a mixture of ethanol (400 ml.) and chloroform (60 mls.) as purple needles (0.8 gm.) with M. Pt. 290–292° C. When incorporated in a silver iodobromide emulsion the sensitivity was extended to 6000 A. with a maximum at 5850 A., whilst in a silver chlorobromide the sensitivity extended to 5850 A. with a maximum at 5500 A.

EXAMPLE 5

3-benzoyl-1-phenyl-2-thio-5-[(3-methyl-2-thiazolidinylidene)ethylidene]thiohydantoin

The compound was prepared in the same way as Example 1 except that the starting material was 2-methylthiazoline metho-p-toluene sulphonate (2.9 gm.), and the dye condensation carried out in 10 mls. of ethanol. The crude dye (1.3 gm., M. Pt. 245–249° C.) was boiled with ethanol (250 ml.) and the residue crystallised from chloroform (75 ml.) from which the product separated as a red powder (0.45 gm.) with M. Pt. 265–268° C. When incorporated in a silver chlorobromide emulsion the sensitivity was extended to 5650 A. with a maximum at 5300 A.

EXAMPLE 6

3-benzoyl-1-phenyl-2-thio-5[(3-ethyl-2-thiazolidinylidene)ethylidene]thiohydantoin

The compound was prepared in the same way as Example 1, except that the starting material was 2-methylthiazoline etho-p-toluene sulphonate and the dye condensation carried out in 10 mls. of ethanol. The crude dye (1.2 gm.) was dissolved in a mixture of ethanol (200 mls.) and chloroform (30 mls.) from which the product separated as red crystals (0.9 gm.) with M. Pt. 247–249° C. When incorporated in a silver chlorobromide emulsion the sensitivity was extended to 5650 A. with a maximum at 5250 A.

EXAMPLE 7

3-benzoyl-1-phenyl-2-thio-5[(1:4:4-trimethyl-2-pyrrolidinylidene)ethylidene]thiohydantoin

3-benzoyl-1-phenyl-2-thiohydantoin (2.0 gm.), 2(acetanilinovinyl)-4:4-dimethyl pyrroline methiodide (2.0 gm.), ethanol (10 ml.) and triethylamine (1.4 ml.) were mixed and heated under reflux for 10 minutes. The product which separated on cooling was filtered off and washed with water followed by ethanol. The crude dye (0.7 gm.) had M. Pt. 210–214° C. and after two crystallisations from ethanol was obtained as orange-red crystals (0.4 gm.) with M. Pt. 237–239° C.

EXAMPLE 8

3-benzoyl-1-phenyl-2-thio-5[(1-ethyl-4:4-dimethyl-2-pyrrolidinylidene)ethylidene]thiohydantoin

The compound was prepared as in Example 7 except that 2(acetanilinovinyl)-4:4-dimethyl pyrroline ethiodide (2.1 gm.) was used in place of the methiodide. The crude dye (1.0 gm.) had M. Pt. 245–248° C. and after crystallising from a mixture of ethanol (100 ml.) and chloroform (30 ml.) was obtained as gleaming orange plates (0.65 gm.) with M. Pt. 246–248° C.

EXAMPLE 9

3-benzoyl-1-methyl-5(3-methyl-2:3-dihydro-2-benzthiazolylidene)-2-thiohydantoin

3-benzoyl-1-methyl-2-thiohydantoin (0.59 gm.), 2-methylthiobenzthiazole metho toluene p-sulphonate (0.93 gm.), ethanol (5 ml.) and triethylamine (0.35 ml.) were mixed and heated under reflux for 20 minutes. After cooling, the crude dye (M. Pt. 231–233° C.) was filtered off and twice crystallised from benzene to give orange-yellow crystals with M. Pt. 242–244° C.

When incorporated in a silver chlorobromide emulsion the sensitivity was extended to 5050 A. with a maximum at 4550 A.

EXAMPLE 10

3-benzoyl-1-methyl-5[(1-ethyl-4:4-dimethyl-2-pyrrolidinylidene)ethylidene]-2-thiohydantoin

3-benzoyl-1-methyl-2-thiohydantoin (0.78 g.), 2-(acetanilinovinyl)-4:4-dimethyl pyrroline ethiodide (2.0 gm.), ethanol (10 ml.) and triethylamine (0.46 ml.) were mixed and heated under reflux for 20 minutes. After cooling, the crude product (M. Pt. 180–182° C.) was filtered off and twice crystallised from ethanol to give scarlet plates with M. Pt. 194–195° C.

When incorporated in a silver chlorobromide emulsion the sensitivity was extended to 5350 A. with a maximum at 5000 A.

EXAMPLE 11

3-benzoyl-1-methyl-5[(3-methyl-2:3-dihydro-2-benzoxazolylidene)ethylidene]-2-thiohydantoin

3-benzoyl-1-methyl-2-thiohydantoin (0.78 gm.), 2-(acetanilinovinyl) benzoxazole methiodide (2.1 gm.), ethanol (10 ml.) and triethylamine (0.46 ml.) were mixed and heated under reflux for 20 minutes. After cooling, the crude product (M. Pt. 205–208° C.) was filtered off and crystallised from a mixture of ethanol (50 ml.) and chloroform (25 ml.) to give red crystals with M. Pt. 243–245° C.

When incorporated in a silver chlorobromide emulsion the sensitivity was extended to 5750 A. with a maximum at 5250 A.

EXAMPLE 12

3-benzoyl-1-methyl-5(1-methyl-2-quinolylidene)-2-thiohydantoin

2-methylthioquinoline (0.88 gm.) and methyl toluene p-sulphonate (0.95 gm.) were mixed and fused at 100° C. for 2 hours. After stirring the melt with dry ether and decanting off, 3-benzoyl-1-methyl-2-thiohydantoin (0.78 gm.), ethanol (10 ml.) and triethylamine (0.46 ml.) were added and the whole heated under reflux for 20 minutes. After cooling, the product was filtered off (M. Pt. 238–240° C.) and crystallised from benzene (100 ml.) to give purple crystals with M. Pt. 245–247° C.

When incorporated in a silver chlorobromide emulsion a band of sensitivity extended from 4800 A. to 5600 A.

EXAMPLE 13

3-benzoyl-1-methyl-5(1-methyl-1:4-dihydroquinazolinylidene-4)-2-thiohydantoin

3-benzoyl-1-methyl-2-thiohydantoin (0.78 gm.), 4-methylthioquinazoline methiodide (1.6 gm.), ethanol (10 ml.) and triethylamine (0.46 ml.) were mixed and heated under reflux for 20 minutes. After cooling, the crude product (M. Pt. 124–126° C.) was filtered off, washed with water and then twice crystallised from benzene to give red crystals with M. Pt. 142–144° C.

EXAMPLE 14

3-benzoyl-1-methyl-5-[(1:3:3-trimethylindolinylidene) ethylidene]-2-thiohydantoin 3-benzoyl-1-methyl-2-thiohydantoin (0.78 gm.), 2(acetanilinovinyl) 1:3:3-trimethyl indolenium iodide (2.2 gm.), ethanol (10 ml.) and triethylamine (0.46 ml.) were mixed and heated under reflux for 20 minutes. After cooling the crude product (M. Pt. 112–113° C.) was filtered off and crystallised from benzene (20 ml.) to give red crystals with M. Pt. 218–220° C.

EXAMPLE 15

3-benzoyl-1-methyl-5[(3-methyl-2-thiazolidinylidene) ethylidene]-2-thiohydantoin 2-methyl thiazoline metho toluene p-sulphonate (1.5 gm.), diphenyl formamide (1.0 gm.) and acetic anhydride (5 ml.) were mixed and heated under reflux for 20 minutes. After cooling, dry ether was added to precipitate a gum which was stirred with further portions of dry ether. To this residue was added: 3-benzoyl-1-methyl-2 thiohydantoin (0.78 gm.), ethanol (10 ml.) and triethylamine (0.7 ml.), the whole then being heated under reflux for 20 minutes. The crude dye (M. Pt. 221–223° C.) was filtered off after cooling and crystallised from ethanol to give orange crystals with M. Pt. 225–227° C.

EXAMPLE 16

3-benzoyl-1-methyl-5[(3-methyl-2:3-dihydro-2-benzthiazolylidene) butenylidene]-2-thiohydantoin β-Anilino-acrolein anil hydrochloride (3.0 gm.), 3-benzoyl-1-methyl-2-thiohydantoin, doubly fused sodium acetate (0.8 gm.) and acetic anhydride (5 ml.) were mixed and heated over a small flame for 3 minutes. After cooling the mixture was diluted with ether to precipitate a gum which was stirred with water and then a small volume of methanol. The residue was then mixed with 2-methylbenzthiazole methiodide (0.15 gm.), ethanol (5 ml.) and triethylamine (0.07 gm.) and the solution heated under reflux for 20 minutes. After cooling, the product was filtered off and crystallised from ethanol (20 ml.) to give blue crystals with M. Pt. 231–233° C.

What we claim is:

1. The compound 3-benzoyl-1-phenyl-2-thio-5 [(3-ethyl-2:3-dihydro-2-benzthiazolylidene) ethylidene] thiohydantoin.

2. The compound 3-benzoyl-1-phenyl-2-thio-5 [(3-methyl-2:3-dihydro-2-benzoxazolylidene) ethylidene] thiohydantoin.

3. The compound 3-benzoyl-1-phenyl-2-thio-5 [(3-ethyl-2:3-dihydro-2-benzoxazolylidene) ethylidene] thiohydantoin.

4. The compound 3-benzoyl-1-phenyl-2-thio-5 [(3-methyl-2-thiazolidinylidene) ethylidene] thiohyantoin.

5. The compound 3-benzoyl-1-phenyl-2-thio-5 [(3-ethyl-2-thiazolidinylidene) ethylidene] thiohydantoin.

6. A merocyanine dye of the general formula:

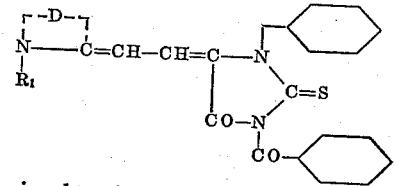

where $R_1$ is selected from the class consisting of methyl and ethyl groups, and D is a residue selected from the class consisting of benzthiazole, benzoxazole and thiazoline nuclei.

References Cited in the file of this patent
UNITED STATES PATENTS

| | | |
|---|---|---|
| 2,177,403 | Brooker | Oct. 24, 1939 |
| 2,719,152 | Jeffreys | Sept. 27, 1955 |